(12) United States Patent
Li et al.

(10) Patent No.: US 10,800,440 B2
(45) Date of Patent: Oct. 13, 2020

(54) SMART SHOPPING CARTS AND CORRESPONDING METHODS THEREOF, AND SMART SHOPPING SYSTEMS

(71) Applicant: BOE Technology Group Co., Ltd., Beijing (CN)

(72) Inventors: Yanfu Li, Beijing (CN); Xiangdong Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 337 days.

(21) Appl. No.: 15/912,806

(22) Filed: Mar. 6, 2018

(65) Prior Publication Data

US 2019/0118844 A1 Apr. 25, 2019

(30) Foreign Application Priority Data

Oct. 25, 2017 (CN) .......................... 2017 1 1006310

(51) Int. Cl.
*B62B 5/00* (2006.01)
*G06Q 20/20* (2012.01)
*B62B 3/14* (2006.01)
*G06Q 30/06* (2012.01)
*G07G 1/00* (2006.01)
*G07G 1/01* (2006.01)

(52) U.S. Cl.
CPC .......... *B62B 5/0096* (2013.01); *B62B 3/1424* (2013.01); *G06Q 20/208* (2013.01); *G06Q 30/0633* (2013.01); *G07G 1/0072* (2013.01); *G07G 1/0081* (2013.01); *G07G 1/01* (2013.01)

(58) Field of Classification Search
CPC .. G07G 1/0072; G07G 1/0081; G06Q 20/208; G06Q 30/0633; B62B 5/0096; B62B 2203/50
See application file for complete search history.

(56) References Cited

U.S. PATENT DOCUMENTS

| 6,435,407 | B1* | 8/2002 | Fiordelisi | G06Q 30/06 |
| | | | | 235/383 |
| 2004/0073489 | A1* | 4/2004 | Varatharajah | B62B 3/1424 |
| | | | | 705/23 |
| 2008/0238009 | A1* | 10/2008 | Carpenter | B62B 3/1408 |
| | | | | 280/33.992 |
| 2014/0001258 | A1* | 1/2014 | Chan | G06Q 10/0875 |
| | | | | 235/385 |

(Continued)

*Primary Examiner* — A. Hunter Wilder
(74) *Attorney, Agent, or Firm* — Westman, Champlin & Koehler, P.A.

(57) ABSTRACT

The present disclosure discloses a smart shopping cart, comprising a shopping basket provided with a cover plate which may be tilted toward the interior of the shopping basket to form an entrance; and the shopping cart further comprises a scanner configured to scan a barcode of a commodity placed on the cover plate to acquire an identity and/or a price of the commodity; a first scale configured to measure a weight of the commodity; a controller configured to generate settlement information of the commodity based on at least one of the identity, the price, and the weight of the commodity, and add the settlement information to a settlement list to update the settlement list; and a display comprising a first display area on which the settlement list is able to be displayed. The present disclosure further discloses a smart shopping system including the shopping cart described above.

14 Claims, 6 Drawing Sheets

(56) References Cited

U.S. PATENT DOCUMENTS

2016/0185375 A1\* 6/2016 Yu .......................... B62B 3/146
                                                          224/411
2017/0158215 A1\* 6/2017 Phillips ................. B62B 5/0096
2018/0005213 A1\* 1/2018 Quartey ................ B62B 3/1424

\* cited by examiner

| Commodity | Number | Price |
|-----------|--------|-------|
| XXX | X | XX |
| XXX | X | XX |
| XXX | X | XX |
| XXX | X | XX |
| XXX | X | XX |
| Total price | | XX |

Crowd flow rate
Entrance — Exit

Commodities in the shopping cart are monitored

Fig. 8

| Commodity | Number | Price |
|-----------|--------|-------|
| XXX | X | XX |
| XXX | X | XX |
| XXX | X | XX |
| XXX | X | XX |
| XXX | X | XX |
| Total price | | XX |

Crowd flow rate
- Fruit area
- Vegetable area
- Meat area
- Seafood area

Commodities in the shopping cart are monitored

Fig. 9

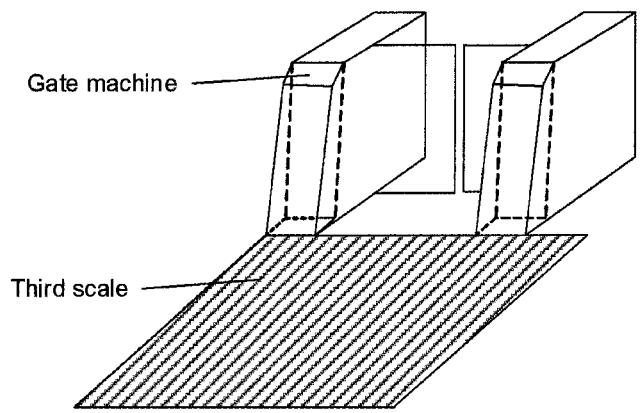

Gate machine

Third scale

Fig. 10

SMART SHOPPING CARTS AND CORRESPONDING METHODS THEREOF, AND SMART SHOPPING SYSTEMS

CROSS-REFERENCE TO RELATED APPLICATION(S)

This application claims priority to the Chinese Patent Application No. 201711006310.4, filed on Oct. 25, 2017, entitled "SMART SHOPPING CARTS AND CORRESPONDING METHODS THEREOF, AND SMART SHOPPING SYSTEMS," which is incorporated herein by reference in its entirety.

TECHNICAL FIELD

The present disclosure relates to the field of smart shopping technology, and more particularly, to a smart shopping cart and a corresponding method thereof, and a smart shopping system including the smart shopping cart.

BACKGROUND

Shopping carts in a conventional supermarket are generally purely loading carts, and settlement of commodities is done by settlement terminals which are set up specifically at a gate of the supermarket. Due to the limitation of a number of the settlement terminals, customers need to queue up when they are ready for settlement of commodities after completing shopping. This results in slow settlement, thus leading to a waste of customers' time while putting pressure on the service quality and management of the supermarket and increasing manpower and equipment costs, which seriously affects the supermarket's revenue.

In addition, the customers cannot acquire consumption information including a total price of commodities to be purchased in real time while purchasing the commodities, which is not beneficial for the customers to grasp and control the consumers' own consumption behaviors. Further, during shopping in the supermarket, there is often a situation in which too many staff members are in an area where a certain type of commodities is located. The customers cannot acquire a crowd flow situation in a relevant area of the supermarket in real time, which easily results in channel congestion and personnel collision or even causes potential safety hazard.

SUMMARY

In order to overcome at least one of the above problems, it is an object of the present disclosure to provide a smart shopping cart through which autonomous settlement is performed to increase the settlement speed and improve the user experience. Further, the commodities are verified at the time of settlement, which ensures the accuracy of the settlement process and prevents losses caused by behaviors such as replacement of a commodity during the settlement process or an action of taking an unsettled commodity out of the supermarket.

In order to achieve the above purposes, the following technical solutions are adopted in the present disclosure.

In an aspect of the present disclosure, there is provided a smart shopping cart, comprising:

a shopping basket provided with a cover plate which can be tilted toward the interior of the shopping basket to form an entrance;

a scanner configured to scan a barcode of a commodity placed on the cover plate to acquire an identity and/or a price of the commodity;

a first scale configured to measure a weight of the commodity;

a controller configured to generate settlement information of the commodity based on at least one of the identity, the price, and the weight of the commodity, and add the settlement information to a settlement list to update the settlement list; and a display including a first display area on which the settlement list is able to be displayed.

The scanner scans a barcode of a commodity to obtain an identity (for example, a name) and/or a price (for example, a unit price or a total price) of the commodity, generates settlement information of the commodity, and adds the settlement information of the commodity to a settlement list for settlement of the commodity which is picked up for purchase, so as to realize autonomous settlement of the commodity by the shopping cart. Further, the entrance through which a commodity is put into the shopping basket and the method for putting the commodity into the shopping basket are provided in the shopping cart, which effectively avoids replacement of the commodity by verifying a weight of the commodity in the process of putting the commodity into the shopping basket, so as to ensure the consistency of commodities in the settlement list and commodities in the shopping cart, and improve the accuracy and feasibility of the autonomous settlement.

In some embodiments, the controller is further configured to:

acquire a weight measured by the first scale in real time during a sliding-in process, if the weight remains unchanged, tilt the cover plate to close the entrance after a second predetermined time; and if the weight changes, delete the settlement information of the commodity in the settlement list, and prompt that the commodity is to be taken out.

The weight of the commodity is measured and determined during sliding-in of the commodity, which can avoid a replacement behavior of the commodity when the commodity is put into the shopping basket. In particular, it solves the problem that commodities with the same weight but different prices cannot be effectively distinguished during commodity verification, and enhances inclusiveness of different situations and applicability in different situations when autonomous settlement is performed by using the shopping cart.

In some embodiments, the smart shopping cart further comprises:

a second scale provided at the bottom of the shopping basket and configured to measure a weight of all the commodities in the shopping basket in real time and communicate with the controller.

The second scale is provided to effectively prevent a commodity which is not scanned from being put into the shopping basket, and make it possible to distinguish a community which is actually put into the shopping basket and a commodity which is scanned by acquiring a weight of the commodity which is actually put into the shopping basket based on a difference value between weights measured by the second scale.

In some embodiments, the controller is further configured to:

determine a weight measured by the first scale when the commodity is scanned as the weight of the commodity;

acquire a weight measured by the first scale in real time during a sliding-in process, if the weight remains unchanged, control the cover plate to close the entrance after a second predetermined time; and if the weight changes, delete corresponding settlement information of the commodity in the settlement list, and prompt that the commodity is to be taken out; and acquire a weight measured by the second scale in real time, calculate a change value of the weight measured by the second scale when the commodity enters the shopping basket, if the change value of the weight is equal to the weight of the commodity, control the cover plate to close the entrance after the second predetermined time; and if the change value of the weight is not equal to the weight of the commodity, delete corresponding settlement information of the commodity in the settlement list, and prompt that the commodity is to be taken out.

The commodity information is collected by the scanner while the first scale is added to verify the process of putting the commodity in the shopping basket, the second scale is added to verify the result of putting the commodity in the shopping basket, and the controller enables the commodity information in the settlement list to correspond to the commodity which is actually in the shopping basket through the two verification processes, which further avoids a phenomenon of replacing the commodity, a phenomenon of placing an unsettled commodity into the shopping basket etc., and ensures the accuracy of the settlement process.

In some embodiments, the controller is further configured to add the weight of the commodity to the corresponding settlement information of the commodity.

The weight of the commodity is added to the commodity information and a correspondence relationship between the weight of the commodity and the commodity is established, so that the weight information of the commodity is acquired during shopping and a step of individually weighting the commodity can be omitted.

In some embodiments, the controller is further configured to determine whether the commodity which is taken out is the commodity based on whether the weight of the commodity is equal to the change value of the weight measured by the second scale when the commodity is taken out.

If the weight of the commodity is equal to the change value of the weight measured by the second scale when the commodity is taken out, it indicates that the commodity which is actually taken out is the commodity which is scanned, that is, the commodity which is taken out is the commodity which is successfully scanned but fails to pass the verification.

If the weight of the commodity is not equal to the change value of the weight measured by the second scale when the commodity is taken out, it indicates that the commodity which is actually taken out is not the commodity which is scanned, that is, the commodity may be replaced and needs to be further processed.

In some embodiments, the controller is further configured to:

delete corresponding settlement information of the commodity in the settlement list and prompt that the commodity is to be taken out if the settlement information of the commodity is included in the settlement list when the barcode of the commodity is scanned.

It is determined whether a commodity which is scanned is a commodity which is in the shopping cart by determining whether the commodity which is scanned is already in the settlement list, so as to revoke the commodity which is scanned and is included in the settlement list, thereby facilitating free pick-up of a commodity by a customer and enhancing the flexibility and user experience of a shopping behavior.

In some embodiments, the controller is further configured to:

acquire the change value of the weight measured by the second scale when the commodity is taken out, and determine whether the commodity which is scanned is the commodity which is taken out based on whether the change value of the weight is equal to the weight of the commodity.

The commodity which is actually taken out may be determined by calculating the change value of the weight measured by the second scale to obtain the weight of the commodity which is taken out, and comparing the weight of the commodity which is taken out with a weight of each commodity in the settlement list. If the commodity which is actually taken out is not the same as the information of the commodity which is scanned when the commodity is revoked, it indicates that the commodity which is actually taken out is not the commodity which is scanned, that is, the commodity may be replaced and needs to be further processed.

In some embodiments, the smart shopping cart further comprises:

a storage bin, provided under the shopping basket, and configured to store items of customers.

The storage bin is provided for the convenience of the customers to put items carried by themselves into the shopping cart, which eliminates the trouble of storing the items outside a shopping area and saves the time for the customers to access the items.

In some embodiments, the storage bin is provided with an electromagnetic lock configured to lock the storage bin in a shopping area.

The storage bin is provided with the electromagnetic lock, which can ensure a locked state of the storage bin in the shopping area, thereby effectively ensuring the safety of the items of the customers while preventing an unsettled commodity from being put into the storage bin and being taken out of the shopping area.

In some embodiments, the display further comprises a second display area on which a crowd flow rate situation in a supermarket is able to be displayed in real time.

The crowd flow rate situation in the supermarket can be displayed through the second display area to provide reference information to customers, which can avoid crowded areas effectively to ensure unobstructed shopping, and achieve guiding of shopping activities for the customers by the supermarket to improve the overall shopping efficiency and improve the purchase experience.

In some embodiments, the controller is further configured to calculate a total price of the commodities in the settlement list and display the total price in the first display area.

The total price of the commodities in the settlement list is calculated and displayed, for convenience for customers to intuitively confirm an amount of commodities to be purchased, and to make timely and reasonable changes to a shopping plan so as to avoid the embarrassment of blindly shopping and purchasing commodities beyond the budget.

In another aspect of the present disclosure, there is provided a smart shopping system, comprising:

the smart shopping cart described above;

a mobile terminal configured to pay for the commodities in an updated settlement list to generate payment information;

a server configured to receive the payment information, determine whether the payment is successful, generate a payment success indicator or a payment failure indicator and transmit the payment success indicator or the payment failure indicator to the mobile terminal; and a gate machine configured to be opened or closed based on the payment success indicator or the payment failure indicator acquired from the mobile terminal, respectively.

The commodities which are picked up for purchase are settled through the shopping cart autonomously, which eliminates the cumbersome process of queuing up for settlement and improves the shopping efficiency; the mobile terminal interacts with the server, which makes the payment process more convenient and efficient; and the gate machine is controlled to be opened and closed based on the payment result, which efficiently ensures the security of the commodities.

In some embodiments, the smart shopping system further comprises:

a third scale provided at the gate machine and configured to measure a first weight M1 of a customer and the smart shopping cart when they enter the gate machine and a second weight M2 of the customer and the smart shopping cart when they leave the gate machine.

In some embodiments, the server is configured to acquire the first weight M1, the second weight M2 and a total weight M3 of the commodities in the shopping basket, and if M3=M2−M1, determine that the shopping is successful; and if M3≠M2−M1, determine that the shopping is failed, and issue alarm information.

A weight change of the customer and the shopping cart before and after the shopping is calculated, and the weight change is compared with the weight of the commodities to be purchased to determine whether the weight change is equal to the weight of the commodities to be purchased, which can effectively determine whether there is a phenomenon of secretly carrying a commodity, so as to further ensure the safety of the commodities.

In some embodiments, the cover plate of the smart shopping cart is able to be opened outside a shopping area.

The area where the cover plate is opened is limited, which not only ensures the safety of the commodities, but also achieves a quick, safe and automatic process of taking the commodities out of the shopping cart outside the commodity area.

In yet another aspect of the present disclosure, there is provided a method performed at a smart shopping cart, comprising: scanning a barcode of a commodity placed on a cover plate of the smart shopping cart to acquire an identity and/or a price of the commodity; measuring a weight of the commodity using a first scale of the smart shopping cart; generating settlement information of the commodity based on at least one of the identity, the price, and the weight of the commodity, and adding the settlement information to a settlement list to update the settlement list; and tilting the cover plate toward the interior of a shopping basket of the smart shopping cart to form an entrance, so that the commodity enters the shopping basket through the entrance; and displaying the settlement list on a display of the smart shopping cart.

In some embodiments, the method further comprises: acquiring a weight measured by the first scale in real time during a sliding-in process, if the weight remains unchanged, tilting the cover plate to close the entrance after a second predetermined time; and if the weight changes, deleting the settlement information of the commodity in the settlement list, and prompting that the commodity is to be taken out.

In some embodiments, the method further comprises: measuring the weight of all the commodities in the shopping basket in real time using a second scale provided at the bottom of the shopping basket.

In some embodiments, the method further comprises: determining a weight measured by the first scale when the commodity is scanned as the weight of the commodity; acquiring a weight measured by the first scale in real time during a sliding-in process, if the weight remains unchanged, controlling the cover plate to close the entrance after a second predetermined time; and if the weight changes, deleting corresponding settlement information of the commodity in the settlement list, and prompting that the commodity is to be taken out; and acquiring a weight measured by the second scale in real time, calculating a change value of the weight measured by the second scale when the commodity enters the shopping basket, if the change value of the weight is equal to the weight of the commodity, controlling the cover plate to close the entrance after the second predetermined time; and if the change value of the weight is not equal to the weight of the commodity, deleting corresponding settlement information of the commodity in the settlement list, and prompting that the commodity is to be taken out.

BRIEF DESCRIPTION OF THE DRAWINGS

The specific embodiments of the present disclosure will be further described in detail below with reference to the accompanying drawings.

FIG. 8 illustrates a diagram of a display condition of a display according to an embodiment of the present disclosure.

FIG. 9 illustrates a diagram of another display condition of a display according to an embodiment of the present disclosure.

FIG. 10 illustrates a structural diagram of a gate machine according to an embodiment of the present disclosure.

DETAILED DESCRIPTION

Figure 1:
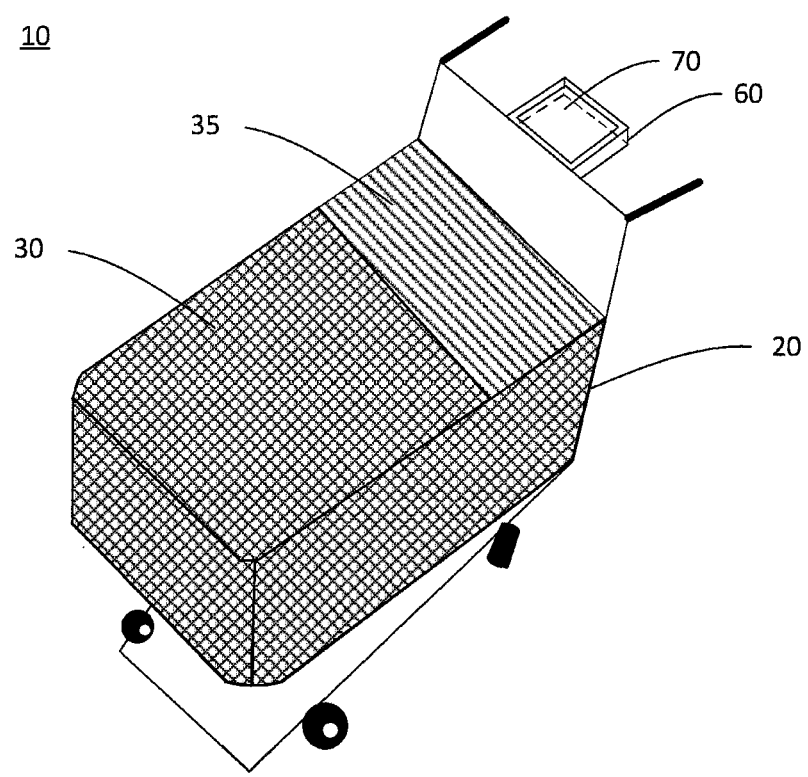
FIG. 1 illustrates a structural diagram of a smart shopping cart according to an embodiment of the present disclosure.

In order to illustrate the present disclosure more clearly, the present disclosure is further described below with reference to some embodiments and the accompanying drawings. Similar parts in the accompanying drawings are denoted by the same reference numerals. It should be understood by those skilled in the art that the following specific description is intended to be illustrative and not restrictive and is not construed to limit the protection scope of the present disclosure.

Terms such as "first," "second," etc. in the specification and claims of the present disclosure and the accompanying drawings are used to distinguish different objects and are not intended to describe a specific order. Moreover, terms such as "include" and "have" and any variations thereof are intended to cover a non-exclusive inclusion. For example, a process, method, system, product, or device which incorporates a series of steps or units is not limited to steps or units which have been listed, but may optionally further comprise steps or units which are not listed or may optionally further comprise steps or units inherent to the process, method or device.

In the related art, autonomous settlement of a shopping cart is mainly performed in the following ways:

1. Weight information of commodities in a supermarket is acquired in advance, and is integrated into barcode information of the commodities. When a barcode of a commodity is scanned for settlement, a weight of the commodity is measured to determine whether the commodity of which the barcode is scanned is a commodity which is actually put into a shopping cart. This settlement method mainly has the following problems: it needs to record the weight information of the commodities in advance, which results in a huge workload; weights of some commodities may change with storage time, which may result in failed settlement due to a difference between actual weights and the weight information which has been recorded; and some commodities with the same weight but different prices, for example, different series of commodities belonging to the same brand, which have the same weight but very different prices, cannot be effectively distinguished.

2. in order to prevent replacement of a commodity when the commodity is put into a shopping cart, a movement state of the commodity when the commodity is put into the shopping cart may further be tracked, to ensure that the commodity which is put into the shopping cart is a commodity of which a barcode is scanned for settlement. However, this settlement method cannot avoid an unsettled commodity from being put into the shopping cart and being taken out of a supermarket. Further, there are a series of problems such as complex calculation for the purpose of tracking the movement state, ease of blocking of light, failure to being taken out after being put in, etc.

3. An image of a commodity is collected when a barcode of the commodity is scanned for settlement, and the collected image is compared with pre-stored images of commodities to determine the commodity which is picked up for purchase. Although this settlement method can distinguish different commodities from each other, it needs to collect the images of the commodities in advance and also cannot avoid a phenomenon that an unsettled commodity is put into a shopping cart and is taken out of a supermarket. Further, the image collection process is cumbersome and has a high requirement for light and angles, which has a low practicality.

In conclusion, there is a need to provide a smart shopping cart having an autonomous settlement function applicable to various conditions, which enhances the settlement speed, ensures the accuracy of the settlement process and prevents losses caused by behaviors such as replacement of a commodity in the settlement process or an action of taking an unsettled commodity out of a supermarket.

As shown in FIG. 1, in an embodiment of the present disclosure, a smart shopping cart 10 is provided. The shopping cart 10 comprises a main body 20 and a shopping basket 30 provided in the main body. The shopping basket is provided with a cover plate 35 which may be tilted toward the interior of the shopping basket to form a commodity entrance or exit. When the cover plate is opened, the cover plate may be, for example, shown in FIG. 2. The shopping cart further comprises a scanner 40 (as shown in FIG. 3), a first scale 50 (as shown in FIG. 3), a controller 60 and a display 70. However, the present disclosure is not limited thereto. In fact, it is also possible to use other forms of cover plate 35 than those shown in FIG. 2, for example a cover plate located at other positions (for example, a side-opened cover plate).

Figure 2:
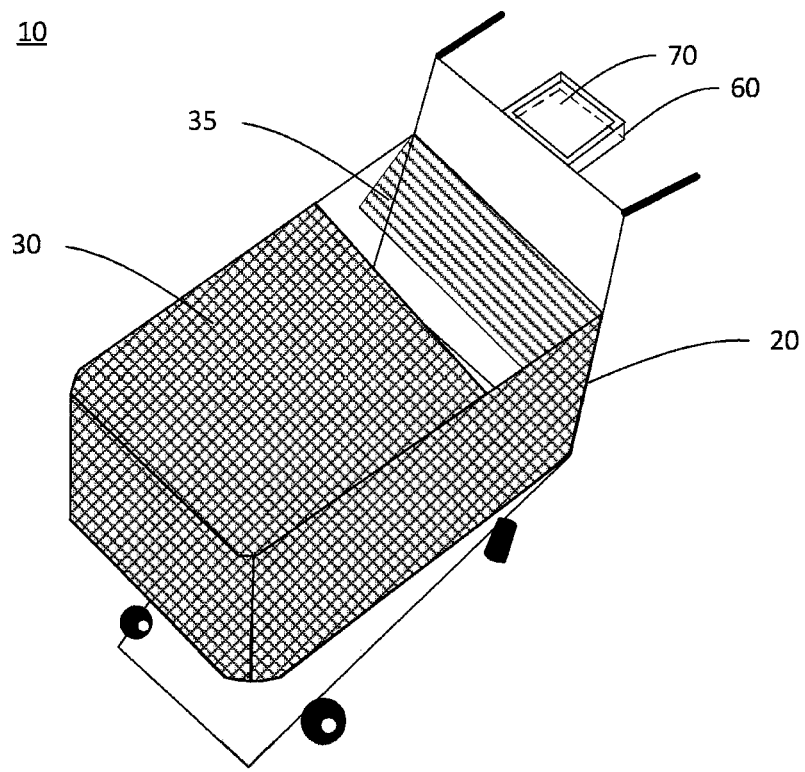
FIG. 2 illustrates a diagram of a state in which a cover plate of the smart shopping cart shown in FIG. 1 is opened.
Figure 3:
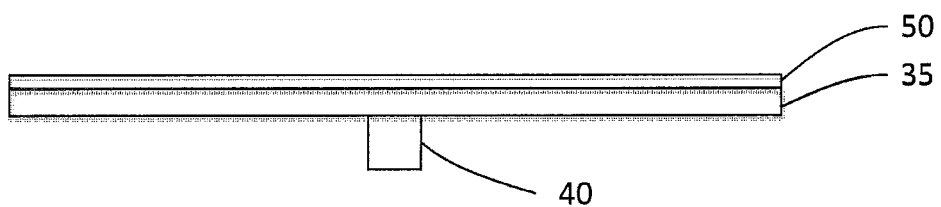
FIG. 3 illustrates a structural cross-sectional view of a cover plate of the smart shopping cart shown in FIG. 1.

As schematically shown in FIGS. 1-2, the display 70 is provided on the controller 60. As schematically shown in FIG. 3, the first scale 50 is, for example, a weight sensor and is provided on an upper portion of the cover plate 35. The scanner 40 is, for example, a scanning gun provided on a lower portion of the cover plate 35. A corresponding area of the scanner 40 is a scanning area. It should be understood that the scanner 40 may scan a commodity placed on the scanning area through the cover plate 35 and the first scale 50, and the scanning area may be set as, for example, an opening structure or a transparent structure, which is not limited here.

In the embodiments of the present disclosure, signal connections between various unit structures may be wired connections or may also be wireless connections.

Specifically, the scanner 40 may, for example, be configured to scan a barcode or another feature of a commodity placed on the cover plate 35, to acquire an identity (for example, a name or a number, etc.) and/or a price (for example, a unit price or a total price) of the commodity; the first scale 50 may be provided on the cover plate 35 and may be configured to measure a weight of the commodity on the cover plate 35 in real time; the controller 60 may be configured to generate settlement information of the commodity based on the identity and/or the price of the commodity, add the settlement information to a settlement list, indicate the cover plate 35 to be tilted after a first predetermined time so that the commodity slides in the shopping basket along the cover plate 35, and update the settlement list based on the weight which is acquired by the first scale 50 in real time during the sliding process; and the display 70 comprises a first display area on which the settlement list can be displayed.

Figure 4:
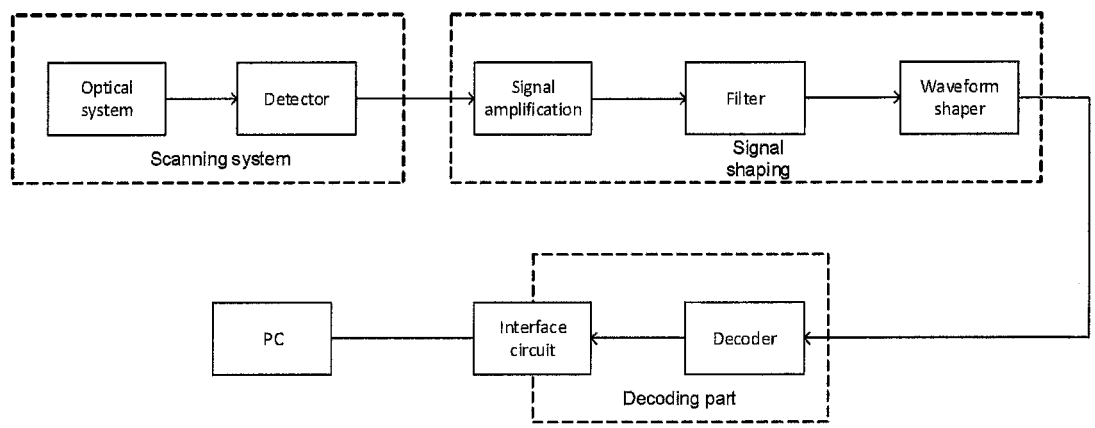
FIG. 4 illustrates a diagram of a scanning process of a scanner according to an embodiment of the present disclosure.

As shown in FIG. 4, the scanner 40 may be a fixed barcode reader including three parts, which are a scanning system, a signal shaping part and a decoding part. However, the present disclosure is not limited thereto. The scanning system may convert the scanned barcode information into an electrical signal. The signal shaping part may convert the acquired electrical signal into a digital signal, which is then provided to the decoding part for processing. The decoding part decodes the digital signal and provides the decoded digital signal to an electronic display screen for processing. When a customer picks up a commodity and decides to use the autonomous settlement manner, the customer needs to scan a barcode on a package of the commodity by himself/herself to obtain information and a price of the commodity. After the scanning is correctly performed, the commodity may be put into a shopping cart.

In the present embodiment, a main body of the shopping cart may comprise conventional components such as a frame, a wheel and a handlebar etc., which are the same as those in the related art, and are not described here again.

It should be illustrated that, in the present embodiment, the shopping basket 30 may be provided with the cover plate 35 which may be tilted toward the interior of the shopping basket 30 to form a commodity entrance/exit thereof, and the cover plate 35 is the only passage for commodities to enter and exit the shopping basket 30. In other words, when the cover plate 35 is not opened, the shopping basket 30 is a closed structure. When and only when the cover plate 35 is tilted, a commodity may be put into the shopping basket 30 through the commodity entrance formed by tilting the cover plate 35 towards the interior of the shopping basket 30 or may be taken out of the shopping basket 30 through the commodity exit.

It can be understood that the closed structure may be a completely sealed structure made of materials such as plexiglass etc. or a mesh structure capable of effectively preventing commodities from passing therethrough, which is not limited here. The cover plate 35 is not limited in terms of size, shape and position as long as the commodity entrance through which a commodity may slide in the shopping basket can be formed.

In the present embodiment, the scanner 40 may scan a barcode of a commodity to obtain an identity and/or a price of the commodity, generate settlement information of the commodity, and add the settlement information of the commodity to a settlement list for settlement of the commodity which is picked up for purchase, so as to realize autonomous settlement of the commodity by the shopping cart. Further, the entrance through which a commodity is put into the shopping basket and the method for putting the commodity into the shopping basket are provided in the shopping cart, which effectively avoids replacement of the commodity by verifying a weight of the commodity in the process of putting the commodity into the shopping basket, so as to ensure the consistency of commodities in the settlement list and commodities in the shopping cart, and improve the accuracy and feasibility of the autonomous settlement.

A specific settlement process comprises preliminary settlement and process verification.

In the preliminary settlement, a commodity to be settled is placed on the cover plate 35 of the shopping basket 30, and the scanner 40 scans a barcode of the commodity and acquires settlement information of the commodity. The controller 60 acquires the settlement information of the commodity and adds the settlement information to a settlement list. For example, as described earlier, the settlement information may comprise an identity and/or a price of the commodity. For example, in a case that a unit price of the commodity is acquired, a total price of the commodity may be calculated in conjunction with a weight of the commodity described below. For example, in a case that the total price of the commodity is acquired (for example, when the commodity has a unit price regardless of the weight), the total price may be directly adopted when the settlement list is updated regardless of the weight thereof.

In the process verification, after the scanning is completed, the controller 60 may control the cover plate 35 to be tilted after a first predetermined time so that the commodity slides in the shopping basket 30 along the cover plate 35. During the sliding process, the first scale 50 may acquire weight information of the commodity in real time. If the weight of the commodity remains unchanged in this process, the cover plate 35 is tilted to close the commodity entrance after a second predetermined time; and if the weight changes, the commodity information in the settlement list is deleted and it is prompted that the commodity is to be taken out.

As the commodity is directly put into the shopping basket after the scanning of the commodity is completed, if the weight of the commodity does not change when the commodity is put into the shopping basket, it is ensured that the commodity is reliably put into the shopping basket. If the weight of the commodity measured by the first scale 50 changes during sliding-in of the commodity, it indicates that replacement of the commodity occurs. This situation may be manually handled by an operator, which is not limited here.

The weight of the commodity is measured and determined during sliding-in of the commodity, which can avoid a replacement behavior of the commodity when the commodity is put into the shopping basket. In particular, it solves the problem that commodities with the same weight but different prices cannot be effectively distinguished during commodity verification, and enhances inclusiveness of different situations and applicability in different situations when autonomous settlement is performed by using the shopping cart.

Figure 5:
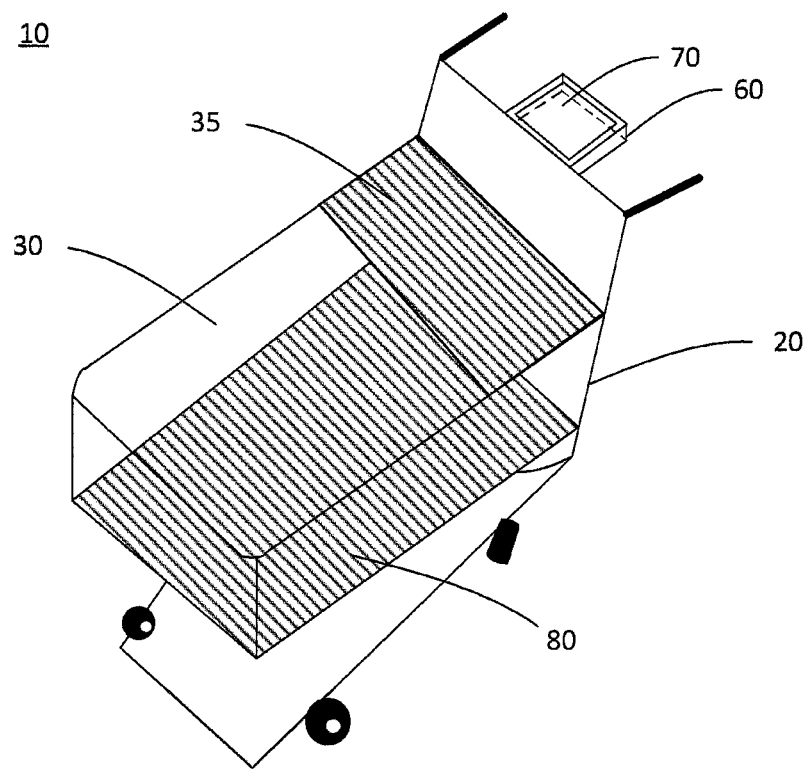
FIG. 5 illustrates a structural diagram of a smart shopping cart according to another embodiment of the present disclosure.

As shown in FIG. 5, in another embodiment of the present disclosure, the smart shopping cart further comprises a second scale 80 provided at the bottom of the shopping basket 30 and configured to measure a weight of all the commodities in the shopping basket 30 in real time.

In the present embodiment, the second scale 80 is provided to effectively prevent a commodity which is not scanned from being put into the shopping basket, and make it possible to distinguish a community which is actually put into the shopping basket and a commodity which is scanned by acquiring a weight of the commodity which is actually put into the shopping basket based on a difference value between weights measured by the second scale 80.

A specific settlement process comprises preliminary settlement, process verification and result verification.

In the preliminary settlement, a commodity to be settled is placed on the cover plate 35 of the shopping basket 30, and the scanner 40 scans a barcode of the commodity and acquires settlement information of the commodity. The controller 60 acquires the settlement information of the commodity and adds the settlement information to a settlement list. The settlement information may be updated in a manner similar to that described above, and details thereof are not described here again.

In the process verification, after the scanning is completed, the controller 60 controls the cover plate 35 to be tilted after a first predetermined time so that the commodity slides in the shopping basket 30 along the cover plate 35. During the sliding process, the first scale 50 acquires weight information of the commodity in real time. If a weight of the commodity remains unchanged, the cover plate 35 is tilted to close the commodity entrance after a second predetermined time; and if the weight changes, the commodity information in the settlement list is deleted and it is prompted that the commodity is to be taken out.

In the result verification, when the commodity is placed on the cover plate 35, a weight measured by the first scale 50 is the weight $m_0$ of the commodity. A weight measured by the second scale 80 is acquired in real time and a change value $\Delta m$ of the weight measured by the second scale 80 when the commodity enters the shopping basket 30 is calculated. If the change value $\Delta m$ of the weight is equal to the weight $m_0$ of the commodity, the plate cover 35 is controlled after the second predetermined time to close the commodity entrance; and if the change value $\Delta m$ of the weight is not equal to the weight $m_0$ of the commodity, corresponding commodity information of the commodity in the settlement list is deleted and it is prompted that the commodity is to be taken out.

The commodity information is collected by the scanner 40 while the first scale 50 is added to verify the process of putting the commodity in the shopping basket, the second scale 80 is added to verify the result of putting the commodity in the shopping basket, and the controller 60 enables the commodity information in the settlement list to correspond to the commodity which is actually in the shopping basket 30 through the two verification processes, which further avoids a phenomenon of replacing the commodity, a phenomenon of placing an unsettled commodity into the shopping basket etc., and ensures the accuracy of the settlement process.

In an example, the controller 60 adds the weight of the commodity to corresponding commodity information of the commodity in the settlement list. The weight of the commodity is added to the commodity information and a correspondence relationship between the weight of the commodity and the commodity is established, so that the weight information of the commodity is acquired during shopping and a step of individually weighting the commodity can be omitted.

For a commodity which fails to pass the verification, the commodity needs to be taken out of the shopping basket 30, and when the commodity is taken out, it needs to determine whether the commodity which is actually taken out is the commodity which is scanned, i.e., the commodity which fails to pass the verification. At this time, the controller 60 determines whether the commodity which is taken out is the commodity based on whether the weight of the commodity is equal to a change value of the weight measured by the second scale 80 when the commodity is taken out. This is specifically performed as follows:

1). If the weight $m_0$ of the commodity is equal to the change value $\Delta m$ of the weight measured by the second scale 80 when the commodity is taken out, it indicates that the commodity which is actually taken out is the commodity which is scanned, that is, the commodity which is taken out is the commodity which is successfully scanned but fails to pass the verification.

2). If the weight $m_0$ of the commodity is not equal to the change value $\Delta m$ of the weight measured by the second scale 80 when the commodity is taken out, it indicates that the commodity which is actually taken out is not the commodity which is scanned, that is, the commodity may be replaced and needs to be further processed.

In another example, the shopping cart may also revoke a commodity which has been picked up for purchase and has been put into the shopping cart. In this example, the controller 60 may further be configured to:

when a barcode of the commodity is scanned, if commodity information has been included in the settlement list, delete the corresponding commodity information of the commodity in the settlement list, and prompt that the commodity is to be taken out.

It should be understood that for the same commodity, the settlement list may be updated once for each operation of scanning a barcode thereof. For example, for a commodity A, commodity information thereof may be added in the settlement list when a barcode thereof is scanned for a first time, the commodity information may be deleted from the settlement list when the barcode thereof is scanned for a second time, and the commodity information thereof may be added in the settlement list when the barcode is scanned for a third time, and so on.

In this example, it is determined whether a commodity which is scanned is a commodity which is in the shopping cart by determining whether the commodity which is scanned is already in the settlement list, so as to revoke the commodity which is scanned and is included in the settlement list, thereby facilitating free pick-up of a commodity by a customer and enhancing the flexibility and user experience of a shopping behavior.

In yet another embodiment, in order to prevent inconsistency between the commodity which is actually taken out and the commodity for which the purchase is revoked, the controller 60 is further configured to:

acquire a change value of the weight measured by the second scale 80 when the commodity is taken out, and determine whether the commodity which is scanned is the commodity which is taken out based on whether the change value of the weight is equal to the weight of the commodity.

In this example, the commodity which is actually taken out may be determined by calculating the change value of the weight measured by the second scale 80 to obtain the weight of the commodity which is taken out, and comparing the weight of the commodity which is taken out with a weight of each commodity in the settlement list. If the commodity which is actually taken out is not the same as the information of the commodity which is scanned when the commodity is revoked, it indicates that the commodity which is actually taken out is not the commodity which is scanned, that is, the commodity may be replaced and needs to be further processed.

Figure 6:
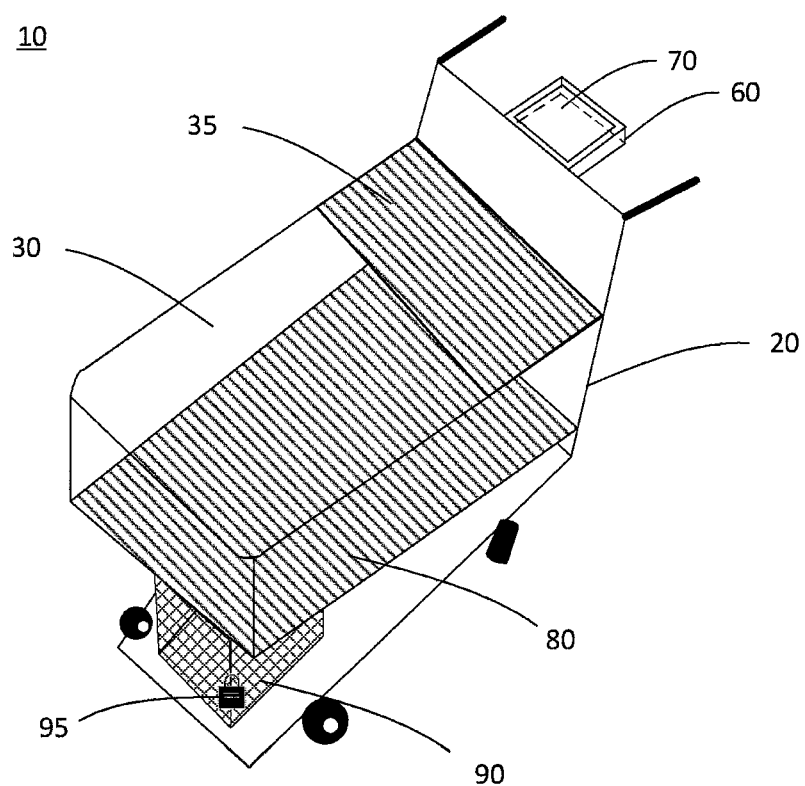
FIG. 6 illustrates a structural diagram of a smart shopping cart according to yet another embodiment of the present disclosure.

As shown in FIG. 6, in another embodiment of the present disclosure, the smart shopping cart 10 may further comprise a storage bin 90 provided under the shopping basket 30 and configured to store items of customers. The storage bin 90 is provided for the convenience of the customers to put items carried by themselves into the shopping cart 10, which eliminates the trouble of storing the items outside a shopping area and saves the time for the customers to access the items.

In an example, the storage bin 90 may further be provided with an electromagnetic lock 95 which is only shown schematically, for locking the storage bin 90 in the shopping area. The storage bin 90 is provided with the electromagnetic lock 95, which can ensure a locked state of the storage bin 90 in the shopping area, thereby effectively ensuring the safety of the items of the customers while preventing an unsettled commodity from being put into the storage bin 90 and being taken out of the shopping area.

Before a customer starts shopping, the customer may put items which cannot be taken into the supermarket into the storage bin 90, and then the electromagnetic lock 95 may be locked when the customer starts shopping in a shopping area. After the shopping is completed, the customer leaves the commodity area after making a payment and the electromagnetic lock 95 is unlocked automatically. The customer may put the items which are carried therewith and need to be stored into the storage bin 90 of the smart shopping cart 10, and do not have to queue up for storage cabinets for storage. When the customer enters the supermarket, the electromagnetic lock 95 will be automatically locked, and when the shopping is completed, the electromagnetic lock 95 will be automatically unlocked to open the storage bin 90 and the customer is prompted to pick up the items.

Figure 7:
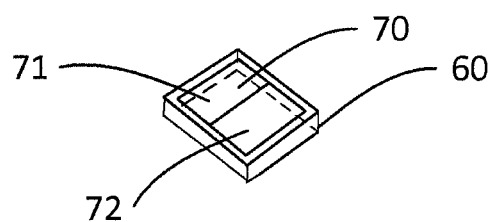
FIG. 7 illustrates a structural diagram of a display of a smart shopping cart according to an embodiment of the present disclosure.

As shown in FIG. 7, in still another embodiment, the display 70 further comprises a second display area 72 for displaying a crowd flow rate situation in a supermarket in real time. That is, the display 70 comprises the first display area 71 and the second display area 72, and it should be understood that the first display area 71 and the second display area 72 are not limited to have a left-right structure or have the same area.

The crowd flow rate situation in the supermarket can be displayed through the second display area 72 to provide reference information to customers, which can avoid crowded areas effectively to ensure unobstructed shopping, and achieve guiding of shopping activities for the customers by the supermarket to improve the overall shopping efficiency and improve the purchase experience.

It should be illustrated that the second display area 72 may update the crowd flow rate situation in the supermarket in real time while displaying partitions of commodities in the supermarket. The crowd flow rate situation may be displayed according to actual positions of the partitions during display. For example, crowd flow rates may be distinguished in terms of degrees of intensity of points in a map of the supermarket, as shown in FIG. 8. The crowd flow rate situation may also be displayed according to aggregated partitions, for example, degrees of intensity of crowd in different regions may be displayed in different colors, as shown in FIG. 9.

In the above embodiment, the controller 60 may further be configured to calculate a total price of the commodities in the settlement list and display the total price in the first display area 71. The total price of the commodities in the settlement list is calculated and displayed, for convenience for customers to intuitively confirm an amount of commodities to be purchased, and to make timely and reasonable changes to a shopping plan so as to avoid the embarrassment of blindly shopping and purchasing commodities beyond the budget.

Yet another embodiment of the present disclosure further provides a smart shopping system, which may comprise the above smart shopping cart, and may further comprise a mobile terminal, a server, and a gate machine. The mobile terminal may be configured to pay for commodities in an updated settlement list to generate payment information. The server may be configured to receive the payment information, determine whether the payment is successful, generate a payment success indicator or a payment failure indicator, and transmit the payment success indicator or the payment failure indicator to the mobile terminal. The gate machine may be opened based on the payment success indicator acquired from the mobile terminal or may be closed based on the payment failure indicator acquired from the mobile terminal. More specifically, for example, when a user with a mobile terminal pushes a shopping cart to go to a gate machine, the mobile terminal may forward a payment success indicator which is previously received from a server to the gate machine to indicate that it has paid for commodities in the shopping cart, so that the gate machine is opened to let the user to pass. In contrast, when the gate machine has not acquired a payment success indicator from the mobile terminal or acquires a payment failure indicator from the mobile terminal within a certain period of time, the gate machine is closed and/or issues an alarm prompt. In addition, the payment success indicator or the payment failure indicator may also be forwarded through the smart shopping cart to the gate machine without the involvement of the mobile terminal.

In the present embodiment, the commodities which are picked up for purchase are settled through the shopping cart autonomously, which eliminates the cumbersome process of queuing up for settlement and improves the shopping efficiency; the mobile terminal interacts with the server, which makes the payment process more convenient and efficient; and the gate machine is controlled to be opened and closed based on the payment result, which efficiently ensures the security of the commodities.

In an example, as shown in FIG. 10, the smart shopping system further comprises a third scale provided at the gate machine and configured to measure a first weight M1 of a customer and a shopping cart when they enter the gate machine and a second weight M2 of the customer and the shopping cart when they leave the gate machine. When the customer is shopping, the server acquires the first weight M1, the second weight M2, and a total weight M3 of commodities in the shopping basket. If M3=M2−M1, it is determined that the shopping is successful; and if M3≠M2−M1, it is determined that the shopping is failed, and alarm information is issued.

In the present embodiment, a weight change of the customer and the shopping cart before and after the shopping is calculated, and the weight change is compared with the weight of the commodities to be purchased to determine whether the weight change is equal to the weight of the commodities to be purchased, which can effectively determine whether there is a phenomenon of secretly carrying a commodity, so as to further ensure the safety of the commodities.

In various embodiments described above, the cover plate of the smart shopping cart is opened outside the shopping area. The area where the cover plate is opened is limited, which not only ensures the safety of the commodities, but also achieves a quick, safe and automatic process of taking the commodities out of the shopping cart outside the commodity area.

Figure 11:
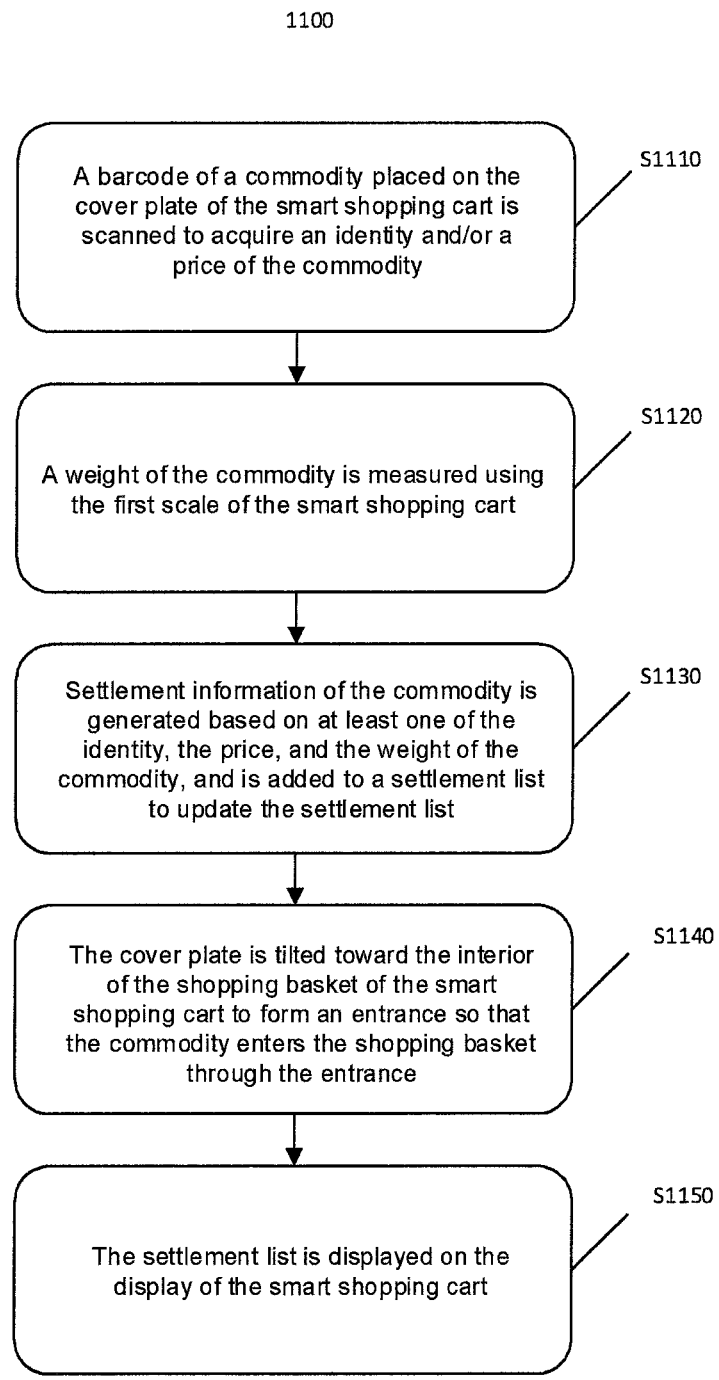
FIG. 11 illustrates a flowchart of an exemplary method performed at a smart shopping cart according to an embodiment of the present disclosure.

An exemplary method 1100 executed at the smart shopping cart 10 according to an embodiment of the present disclosure will be described in detail below with reference to FIG. 11. The smart shopping method 1100 according to the embodiment of the present disclosure may be performed using the steps described in detail below. Specifically, the method 1100 may start at step S1110, where a barcode of a commodity placed on the cover plate 35 of the smart shopping cart 10 may be scanned to acquire an identity and/or a price of the commodity. Next, in step S1120, a weight of the commodity may be measured using the first scale 50 of the smart shopping cart 10. Then, in step S1130, settlement information of the commodity may be generated based on at least one of the identity, the price, and the weight of the commodity, and is added to a settlement list to update the settlement list. Then, in step S1140, the cover plate 35 may be tilted toward the interior of the shopping basket 30 of the smart shopping cart 10 to form an entrance so that the commodity enters the shopping basket 30 through the entrance. In step S1150, the settlement list may be displayed on the display 70 of the smart shopping cart 10. However, it should be illustrated that an order of various steps in the method 1100 is not limited to the order described above. In fact, all or a part of the steps described above may be executed sequentially, in parallel, or in other manners. For example, step S1110 and step S1120 may be executed in parallel or step S1120 may be executed firstly and then step S1110 is executed. The present disclosure is not limited thereto.

In some embodiments, the method 1100 may further comprise: acquiring a weight measured by the first scale 50 in real time during a sliding-in process, if the weight remains unchanged, tilting the cover plate 35 to close the entrance after a second predetermined time; and if the weight changes, deleting the settlement information of the commodity in the settlement list, and prompting that the commodity is to be taken out. In some embodiments, the method 1100 may further comprise: measuring a weight of all the commodities in the shopping basket 30 in real time using the second scale 80 provided at the bottom of the shopping basket 30. In some embodiments, the method 1100 may further comprise: determining a weight measured by the first scale 50 when the commodity is scanned as the weight of the commodity; acquiring a weight measured by the first scale 50 in real time during a sliding-in process, if the weight remains unchanged, controlling the cover plate 35 to close the entrance after a second predetermined time; and if the weight changes, deleting corresponding settlement information of the commodity in the settlement list, and prompting that the commodity is to be taken out; and acquiring a weight measured by the second scale 80 in real time and calculating a change value of the weight measured by the second scale 80 when the commodity enters the shopping basket 30, if the change value of the weight is equal to the weight of the commodity, controlling the cover plate 35 to close the entrance after the second predetermined time; and if the change value of the weight is not equal to the weight of the commodity, deleting the corresponding settlement information of the commodity in the settlement list, and prompting that the commodity is to be taken out.

Obviously, the foregoing embodiments of the present disclosure are merely examples for clearly illustrating the present disclosure, and are not intended to limit the embodiments of the present disclosure. Those of ordinary skill in the art can make other different forms of variations or changes based on the foregoing description. It is impossible to give all exhaustive embodiments here, and all the obvious variations or changes which are derived from the technical solutions of the present disclosure are still within the protection scope of the present disclosure.

We claim:

1. A smart shopping cart, comprising:
a shopping basket provided with a cover plate which can be tilted toward the interior of the shopping basket to form an entrance;
a scanner configured to scan a barcode of a commodity placed on the cover plate to acquire an identity and/or a price of the commodity;
a first scale configured to measure a weight of the commodity;
a second scale provided at the bottom of the shopping basket and configured to measure a weight of all the commodities in the shopping basket in real time and communicate with the controller;
a controller configured to generate settlement information of the commodity based on at least one of the identity, the price, and the weight of the commodity, and add the settlement information to a settlement list to update the settlement list; and
a display comprising a first display area on which the settlement list is able to be displayed, wherein the controller is further configured to:
acquire a weight measured by the first scale in real time during a sliding-in process, and predetermined time; and
if the weight changes, delete the settlement information of the commodity in the settlement list, and prompt that the commodity is to be taken out;
wherein the controller is further configured to:
determine a weight measured by the first scale when the commodity is scanned as the weight of the commodity;
acquire a weight measured by the first scale in real time during a sliding-in process,
if the determined weight is equal to the acquired weight, control the cover plate to close the entrance after a first predetermined time; and
if the determined weight is not equal to the acquired weight, delete corresponding settlement information of the commodity in the settlement list, and prompt that the commodity is to be taken out; and
acquire a weight measured by the second scale in real time, calculate a change value of the weight measured by the second scale when the commodity enters the shopping basket,
if the change value of the weight is equal to the weight of the commodity, control the cover plate to close the entrance after the first predetermined time; and
if the change value of the weight is not equal to the weight of the commodity, delete corresponding settlement information of the commodity in the settlement list, and prompt that the commodity is to be taken out.

2. The smart shopping cart according to claim 1, wherein the controller is further configured to add the weight of the commodity to the corresponding settlement information of the commodity.

3. The smart shopping cart according to claim 2, wherein the controller is further configured to determine whether the commodity which is taken out is the commodity based on whether the weight of the commodity is equal to the change value of the weight measured by the second scale when the commodity is taken out.

4. The smart shopping cart according to claim 2, wherein the controller is further configured to delete corresponding settlement information of the commodity in the settlement list and prompt that the commodity is to be taken out if the settlement information of the commodity is comprised in the settlement list when the barcode of the commodity is scanned.

5. The smart shopping cart according to claim 4, wherein the controller is further configured to:
acquire the change value of the weight measured by the second scale when the commodity is taken out, and determine whether the commodity which is scanned is the commodity which is taken out based on whether the change value of the weight is equal to the weight of the commodity.

6. The smart shopping cart according to claim 1, further comprising:
a storage bin, provided under the shopping basket, and configured to store items of customers.

7. The smart shopping cart according to claim 6, wherein the storage bin is provided with an electromagnetic lock configured to lock the storage bin in a shopping area.

8. The smart shopping cart according to claim 1, wherein the display further comprises a second display area on which a crowd flow rate situation in a supermarket is able to be displayed in real time.

9. The smart shopping cart according to claim 1, wherein the controller is further configured to calculate a total price of the commodities in the settlement list and display the total price in the first display area.

10. A smart shopping system, comprising:
a smart shopping cart comprising:
a shopping basket provided with a cover plate which can e tilted toward the interior of the shopping basket to form an entrance;

a scanner configured to scan a barcode of a commodity placed on the cover plate to acquire an identity and/or a price of the commodity;

a first scale configured to measure a weight of the commodity;

a second scale provided at the bottom of the shopping basket and configured to measure a weight of all the commodities in the shopping basket in real time and communicate with the controller;

a controller configured to generate settlement information of the commodity based on at least one of the identity, the price, and the weight of the commodity, and add the settlement information to a settlement list to update the settlement list; and a display comprising a first display, area on which the settlement list is able to be displayed;

a mobile terminal configured to pay for the commodities in the settlement list to generate payment information;

a server configured to receive the payment information, determine whether the payment is successful, generate a payment success indicator or a payment failure indicator, and transmit the payment success indicator or the payment failure indicator to the mobile terminal; and a gate machine configured to be opened or closed based on the payment success indicator or the payment failure indicator acquired from the mobile terminal, respectively, wherein the controller is further configured to:

acquire a weight measured by the first scale in real time during a sliding-in process, and if the weight remains unchanged, tilt the cover plate to close the entrance after a first predetermined time; and if the weight changes, delete the settlement information of the commodity in the settlement list, and prompt that the commodity is to be taken out, wherein the controller is further configured to:

determine a weight measured by the first scale when the commodity is scanned as the weight of the commodity;

acquire a weight measured by the first scale in real time during a sliding-in process, if the determined weight is equal to the acquired weight, control the cover plate to close the entrance after a first predetermined time; and if the determined weight is not equal to the acquired weight, delete corresponding settlement information of the commodity in the settlement list, and prompt that the commodity is to be taken out; and acquire a weight measured by the second scale in real time, calculate a change value of the weight measured by the second scale when the commodity enters the shopping basket, if the change value of the weight is equal to the weight of the commodity, control the cover plate to close the entrance after the first predetermined time; and if the change value of the weight is not equal to the weight of the commodity, delete corresponding settlement information of the commodity in the settlement list, and prompt that the commodity is to be taken out.

11. The smart shopping system according to claim 10, further comprising:

a third scale provided at the gate machine and configured to measure a first weight of a customer and the smart shopping cart when they enter the gate machine and a second weight of the customer and the smart shopping cart when they leave the gate machine.

12. The smart shopping system according to claim 11, wherein the server is configured to acquire the first weight, the second weight, and a total weight of the commodities in the shopping basket, and if the total weight of the commodities in the shopping basket is equal to the second weight minus the first weight, determine that the shopping is successful; and if the total weight of the commodities in the shopping basket is not equal to the second weight minus the first weight, determine that the shopping is failed, and issue alarm information.

13. The smart shopping system according to claim 10, wherein the cover plate of the smart shopping cart is able to be opened outside a shopping area.

14. A method performed at a smart shopping cart, comprising:

scanning a barcode of a commodity placed on a cover plate of the smart shopping cart to acquire an identity and/or a price of the commodity;

measuring a weight of the commodity using a first scale of the smart shopping cart; measuring the weight of all the commodities in the shopping basket in real time using a second scale provided at the bottom of the shopping basket;

generating settlement information of the commodity based on at least one of the identity, the price, and the weight of the commodity, and adding the settlement information to a settlement list to update the settlement list; and tilting the cover plate toward the interior of a shopping basket of the smart shopping cart to form an entrance, so that the commodity enters the shopping basket through the entrance; and displaying the settlement list on a display of the smart shopping cart, wherein the method further comprises:

acquiring a weight measured by the first scale in real time during a sliding-in process, if the weight remains unchanged, tilting the cover plate to close the entrance after a first predetermined time; and if the weight changes, deleting the settlement information of the commodity in the settlement list, and prompting that the commodity is to be taken out, wherein the method further comprises:

acquiring a weight measured by the first scale in real time during a sliding-in process, if the weight remains unchanged, tilting the cover plate to close the entrance after a first predetermined time; and if the weight changes, deleting the settlement information of the commodity in the settlement list, and prompting that the commodity is to be taken out, the method further comprises:

determining a weight measured by the first scale when the commodity is scanned as the weight of the commodity;

acquiring a weight measured by the first scale in real time during a sliding-in process, if the determined weight is equal to the acquired weight, controlling the cover plate to close the entrance after a first predetermined time; and if the determined weight is not equal to the acquired weight, deleing corresponding settlement information of the commodity in the settlement list, and prompting that the commodity is to ht taken out; and acquiring a weight measured by the second scale in real time, calculating a change value of the weight measured by the second scale when the commodity enters the shopping basket, if the change value of the weight is equal to the weight of the commodity, controlling the cover plate to close the entrance after the first predetermined time; and if the change value of the weight is not equal to the weight of the commodity, deleting corresponding settlement information of the commodity in the settlement list, and prompting that the commodity is to be taken out.

* * * * *